United States Patent [19]

Nagano et al.

[11] Patent Number: 5,271,050
[45] Date of Patent: Dec. 14, 1993

[54] CORE CONSTRUCTION OF A BOILING NUCLEAR REACTION

[75] Inventors: Mamoru Nagano; Hisao Nogiwa, both of Kanagawa, Japan

[73] Assignee: Kabushiki Kaisha Toshiba, Kawasaki, Japan

[21] Appl. No.: 881,296

[22] Filed: May 11, 1992

[30] Foreign Application Priority Data

May 20, 1991 [JP] Japan .................. 3-114992

[51] Int. Cl.⁵ .............................. G21C 7/30
[52] U.S. Cl. .............................. 376/267
[58] Field of Search .............. 376/267, 349

[56] References Cited

U.S. PATENT DOCUMENTS 4,567,018  1/1986  Enomoto et al. .......... 376/267

FOREIGN PATENT DOCUMENTS 56-129888  10/1981  Japan .
62-96889   5/1987   Japan .................. 376/267

Primary Examiner—Daniel D. Wasil
Attorney, Agent, or Firm—Oblon, Spivak, McClelland, Maier & Neustadt

[57] ABSTRACT

A core construction for boiling water nuclear reactor in which a multiplicity of core units each having four fuel assemblies disposed in a square pattern adjacent to a control rod are arranged to form a reactor core, wherein the reactor core comprises control cells comprising four fuel assemblies which have been in the core more than three cyclic periods. The fuel assemblies located in the outer peripheral portion of the core are fuel assemblies which have been in the core more than three cyclic periods. Most of the core units comprise four fuel assemblies of first-, second-, third- or fourth-burning cyclic periods. The core is rotationally symmetric by 90 degrees. The core can be divided into four identical ¼ cores by two vertical planes passing axial center lines of the core. Each of the ¼ cores is substantially mirror symmetric about a plane passing the axial center line of the core.

7 Claims, 5 Drawing Sheets

CORE CONSTRUCTION OF A BOILING NUCLEAR REACTION

BACKGROUND OF THE INVENTION

The present invention relates to a core construction for a boiling water nuclear reactor.

A core of a boiling water reactor is constructed by arranging a multiplicity of core units 14. As shown in FIG. 1, the core unit 14 consists of four fuel assemblies 12 which are arranged in a square adjacent a control rod 13 at their center. Each of the fuel assemblies 12 comprises a plurality of fuel rods 11.

Generally, the nuclear reactor is continuously operated in a planned term, and the term is called a cycle. After the nuclear reactor is operated in the cycle, some fuel assemblies are replaced by new ones, and the core construction of the nuclear reactor is rearranged.

Then the nuclear reactor is continuously reoperated in the next cycle.

Generally, $\frac{1}{4}$ or $\frac{1}{3}$ of the total fuel assemblies are replaced by new fuel assemblies at the start of a cycle. Such core construction is called four or three batch replacing core, respectively. The new fuel assembly newly loaded in a core is called "the fuel assembly of first-burning cyclic period". The fuel assembly burned up in one cycle and remained in the core in the next cycle as its second cycle is called "the fuel assembly of second-burning cyclic period". The fuel assembly burned up in two cycles and remained in the core in the next cycle as its third cycle is called "the fuel assembly of third-burning cyclic period". The fuel assembly burned up in three cycles and remained in the core in the next cycle as its fourth cycle is called "the fuel assembly of fourth-burning cyclic period".

The control cell is a core unit in which a control rod is adjusted during normal operation of the reactor.

In recent years, fuel assemblies of higher enrichment are being used, and core construction of more than four batch replacing core is considered. In this type of core construction, however, thermal power densities of the fuel assemblies of the first- and second-burning cyclic period become higher, the power distribution in the core becomes less uniform and sub-critical margin decreases.

Japanese Patent Disclosure (kokai)56-129888 discloses a core construction of more than four batch replacing. The core has a symmetry of rotation of 90 degrees, and more than 60% of the total core units include each different burned fuel assembly. However, each of the $\frac{1}{4}$ cores is not symmetric itself.

SUMMARY OF THE INVENTION

An object of the present invention is to provide for a core construction to more than four bach replacing for a boiling water nuclear reactor which is advantageous in core monitoring.

Another object of the present invention is to provide for a core construction for a boiling water nuclear reactor in which the power distribution in the core becomes more uniform.

In accordance with the present invention, the foregoing objects, are achieved by providing a boiling water nuclear reactor core in which a multiplicity of core units each having four fuel assemblies disposed in a square pattern adjacent to a control rod are arranged to form the reactor core, wherein said reactor core comprises control cells comprising four fuel assemblies which have been used in the core more than three cyclic periods, fuel assemblies located in an outer peripheral portion of said core which have been used in the core more than three cyclic periods, wherein a majority of the remaining core units each comprise four fuel assemblies, including one from first-burning cyclic periods, one from second-burning cyclic periods, one from third-burning cyclic periods and one from fourth-burning cyclic periods and wherein said core is rotationally symmetric by 90 degrees. The core can be divided into four identical $\frac{1}{4}$ cores by two perpendicular planes passing through the axial center of the core and each of said $\frac{1}{4}$ cores is substantially mirror symmetric about a plane passing through the axial center line of the core and dividing $\frac{1}{4}$ core into two $\frac{1}{8}$ cores.

Other objects, features, and advantages of the present invention will become apparent from the following detailed description. It should be understood, however, that the detailed description and specific examples while indicating preferred embodiments of the invention, are given by way of illustration only, since various changes and modification within the spirit and scope of the invention will become apparent to those skilled in the art from this detailed description.

DESCRIPTION OF THE PREFERRED EMBODIMENTS

Figure 1:
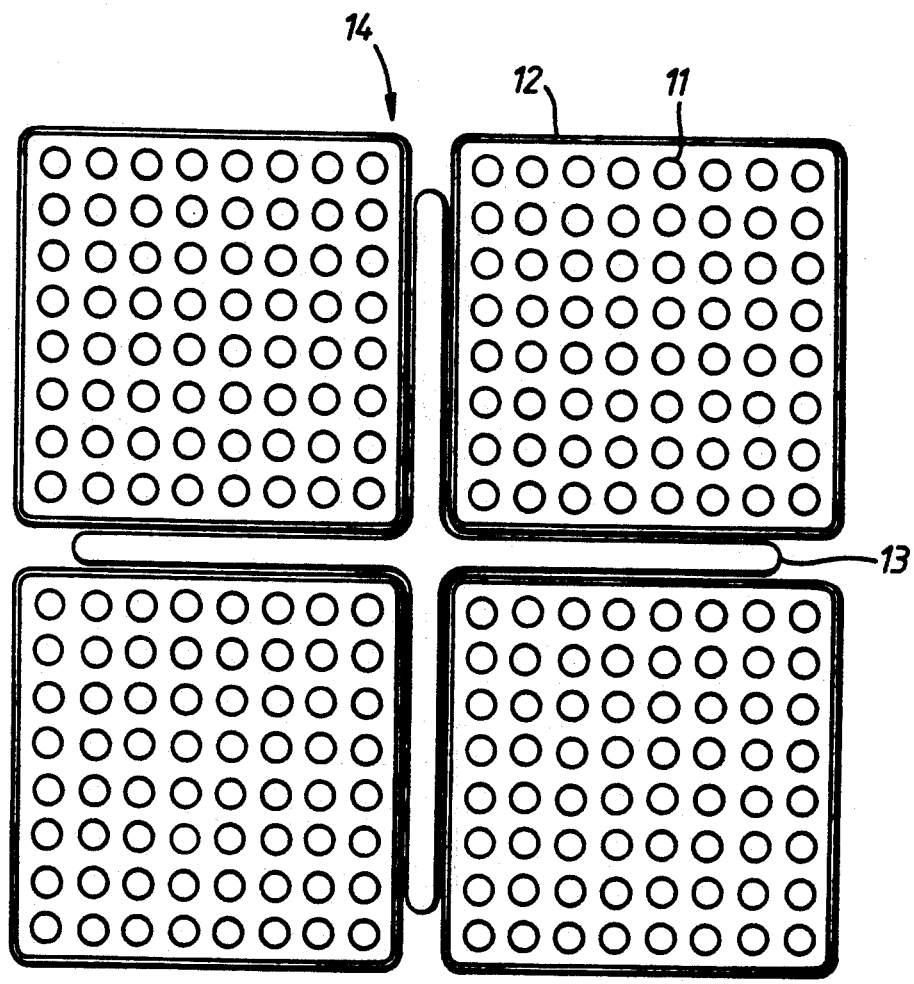
FIG. 1 is a cross-sectional view of a core unit.
Figure 2:
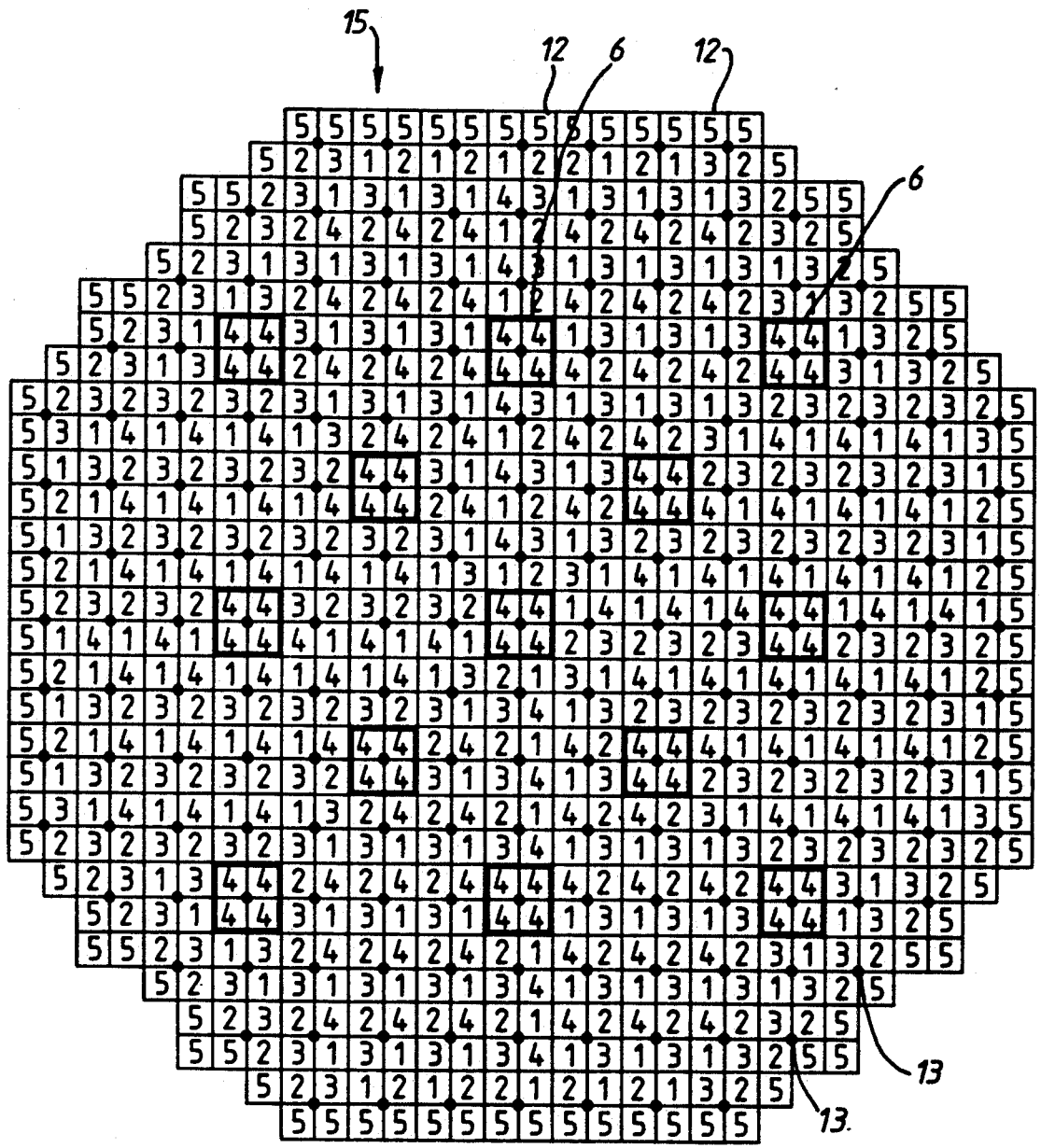
FIG. 2 is a cross-sectional view of a first embodiment of the present invention of a boiling water nuclear reactor core.

FIG. 2 shows a first embodiment of the present invention of a boiling water nuclear reactor core 15. The core 15 is composed of 764 fuel assemblies 12. In FIG. 2, the numerals 1-5 in squares refer to burning cyclic periods of respective fuel assemblies 12 which are located in the core 15. Black dots 13 at intersections show positions of the control rods.

Thirteen squares surrounded by thick lines, each surrounding four fuel assemblies, are referred to as control cells 6.

Each control cell 6 is composed of four fuel assemblies of fourth-burning cyclic period. More than 50% of all the core units, excepting those located in the central position of the core, are composed of four fuel assemblies of first-, second-, third- and fourth-burning cyclic periods. Each core unit is basically composed of fuel assemblies of first- and second-burning cyclic period positioned on a diagonal line in the core unit. The fuel assemblies located in the outer peripheral portion of the core are the fuel assemblies of more than fourth-burning cyclic period, for example; fifth-burning cyclic period, as shown in FIG. 2.

Figure 3:
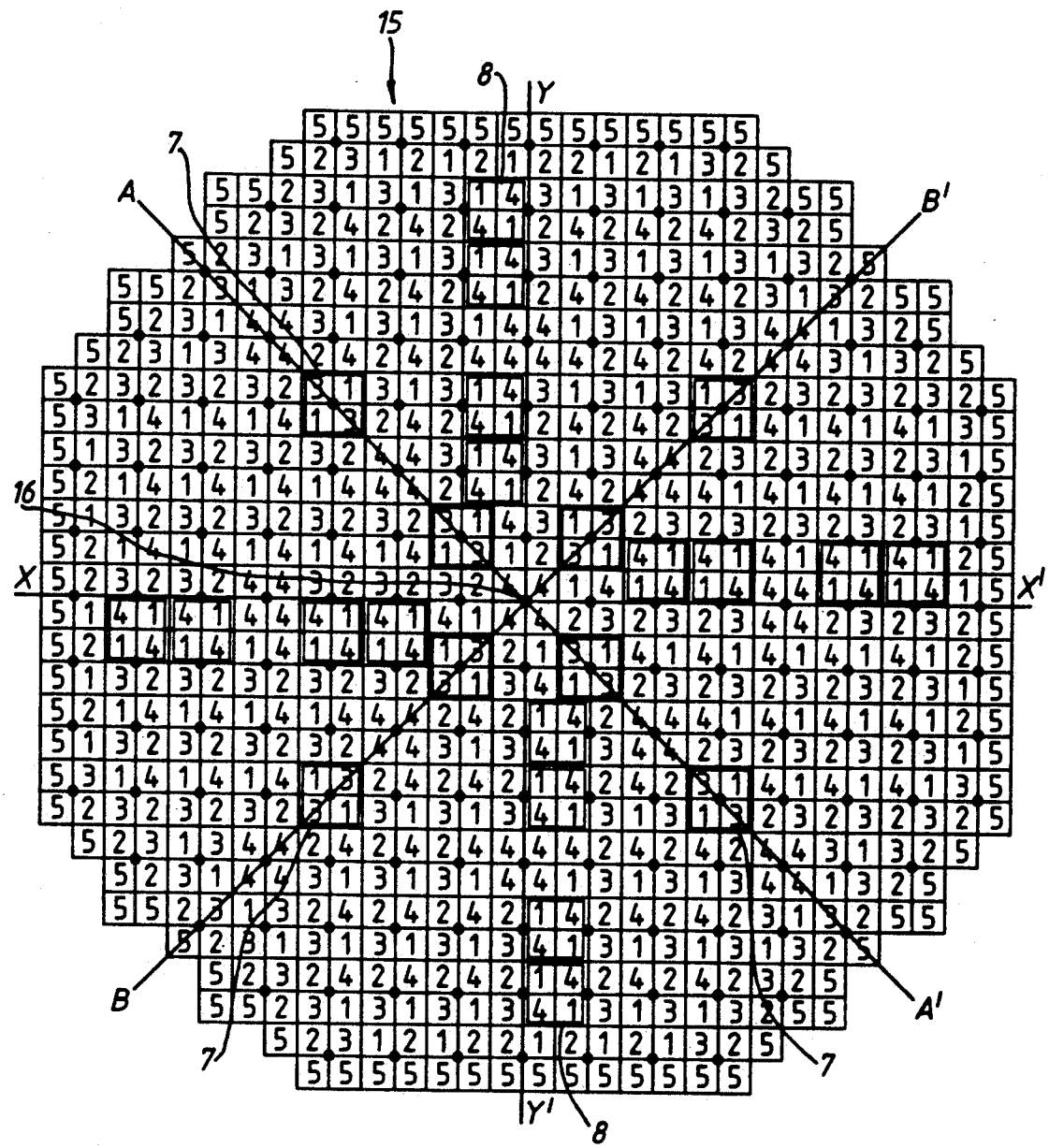
FIG. 3 is a cross-sectional view of the first embodiment shown in FIG. 2, including lines dividing the core into $\frac{1}{8}$ sections.

As shown in FIG. 3, the core shown in FIG. 2 can be divided into four identical ¼ cores by two vertical planes shown as lines X-X' and Y-Y' both of which pass the center position 16 of the core 15. The core is rotationally symmetric by 90 degrees. Then each of the ¼ cores is divided into two ⅛ cores by the lines A-A' and B-B' passing the center 16 of the core.

Each of the core units 7 on lines A-A' or B-B', excepting the cell located on the outer peripheral portion of the core and control cells 6, has same burned fuel assemblies on lines A-A' or B-B' in the core unit in order that the ¼ core is mirror symmetry by the line A-A' or B-B'.

The group of fuel assemblies next to lines X-X' and Y-Y' indicated by numeral 8 include two pairs of two fuel assemblies of the same burning cyclic period positioned on a diagonal line in order that unit cells on lines X-X' and Y-Y' consist of four fuel assemblies of first-, second-, third-or fourth-burning cyclic periods, and the core is symmetry of rotation by 90 degrees.

Figure 4:
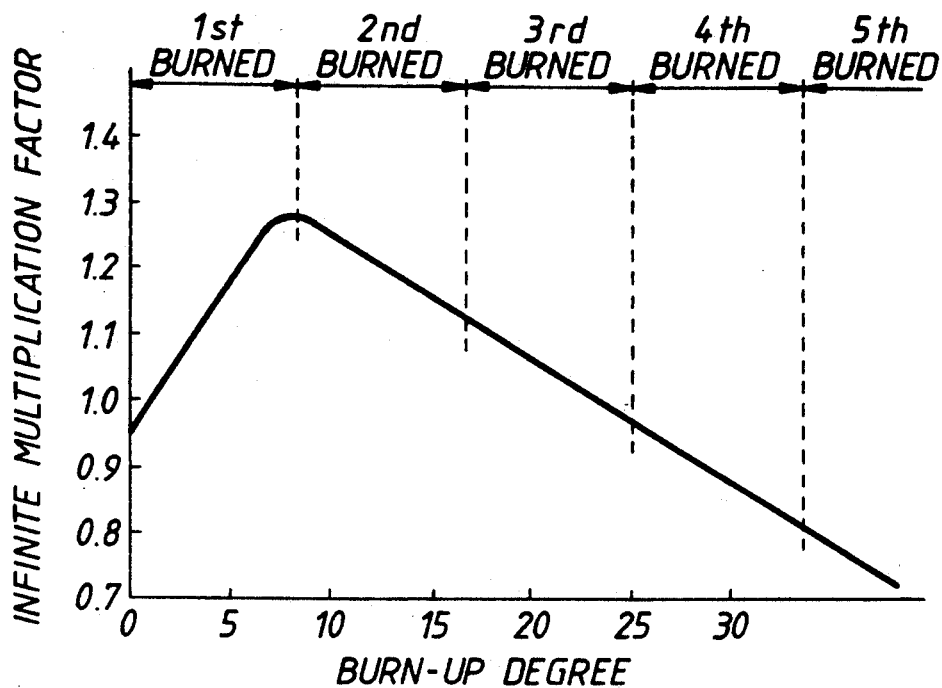
FIG. 4 is a graph showing the characteristics of the infinite multiplication factor versus burn-up degree of nuclear fuel of each burning cyclic period.

FIG. 4 is a graph showing the characteristics of the infinite multiplication factor versus burn-up degree of the fuel assemblies. The infinite multiplication factor is a ratio of the number of neutrons coming out versus the number of absorbed neutrons in infinite existence of the fissile nuclide. The larger the infinite multiplication factor is, the more neutrons come out, which accelerates nuclear fission reaction, and the fuels of larger infinite multiplication factor generate more thermal energy.

Figure 5:
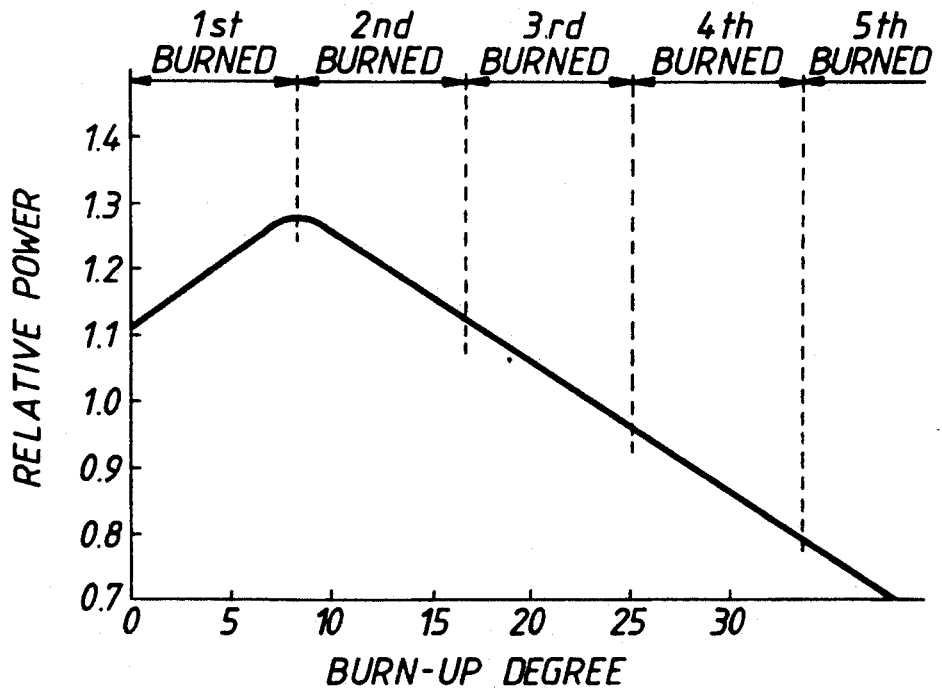
FIG. 5 is a graph showing the characteristics of the relative power of fuel versus burn-up degree of nuclear fuel of each burning cyclic period.

The relative power is not decided only by the infinite multiplication factor. FIG. 5 is a graph showing the characteristics of the relative power and the fuel assemblies of each burning cycle period by typical fuel loading according to FIG. 4. The power of fuel assembly depends not only on the value of infinite multiplication factor but also on the quantity of remaining fissile nuclide. As the value of infinite multiplication factor and quantity of remaining fissile nuclide are both large in the fuel assemblies of first- or second-burning cycle, their relative power is larger than the other fuel assemblies.

In such a construction core, a multiplicity of core units are each composed of four fuel assemblies of four different burning cyclic periods: first-, second-, third- and fourth-burning cyclic periods.

The ¼ core is substantially mirror symmetrical about planes shown as lines A-A' and B-B' in FIG. 3 and the core has a rotation symmetry of 90 degrees. The core is provided in this manner in order that the power distribution in the core becomes more uniform. In such a core arrangement, the thermal energy is evenly distributed. This is advantageous in core monitoring.

The reason control cell 6 is composed of four fuel assemblies of more than fourth-burning cyclic period is that fine control of the output power can be easily achieved using such a control cell.

The fuel assemblies located in the outer peripheral portion of the core are the fuel assemblies of more than fourth-burning cyclic period in order to minimize neutron leakage.

Where the core units located along the lines A-A' or B-B' or core units adjacent to those core units have two fuel assemblies of first-burning cyclic periods on a diagonal line, the other two fuel assemblies are third- or fourth-burned fuel assemblies.

Most of the fuel assemblies of first- and second-burning cyclic period, which have a relative higher power, are surrounded by the fuel assemblies of third- or fourth-burning cyclic periods, which have a relative lower power. Most of fuel assemblies of the first- and second-burning cyclic period are positioned diagonally to each other.

Such arrangement in the core in regard to burning cycle is preferable to minimize local power peaking and to maximize the thermal margin.

In such a core construction, since the ¼ core is substantially mirror symmetric, core neutron distribution or power distribution in the core can be precisely evaluated with a smaller number of detectors.

Figure 6:
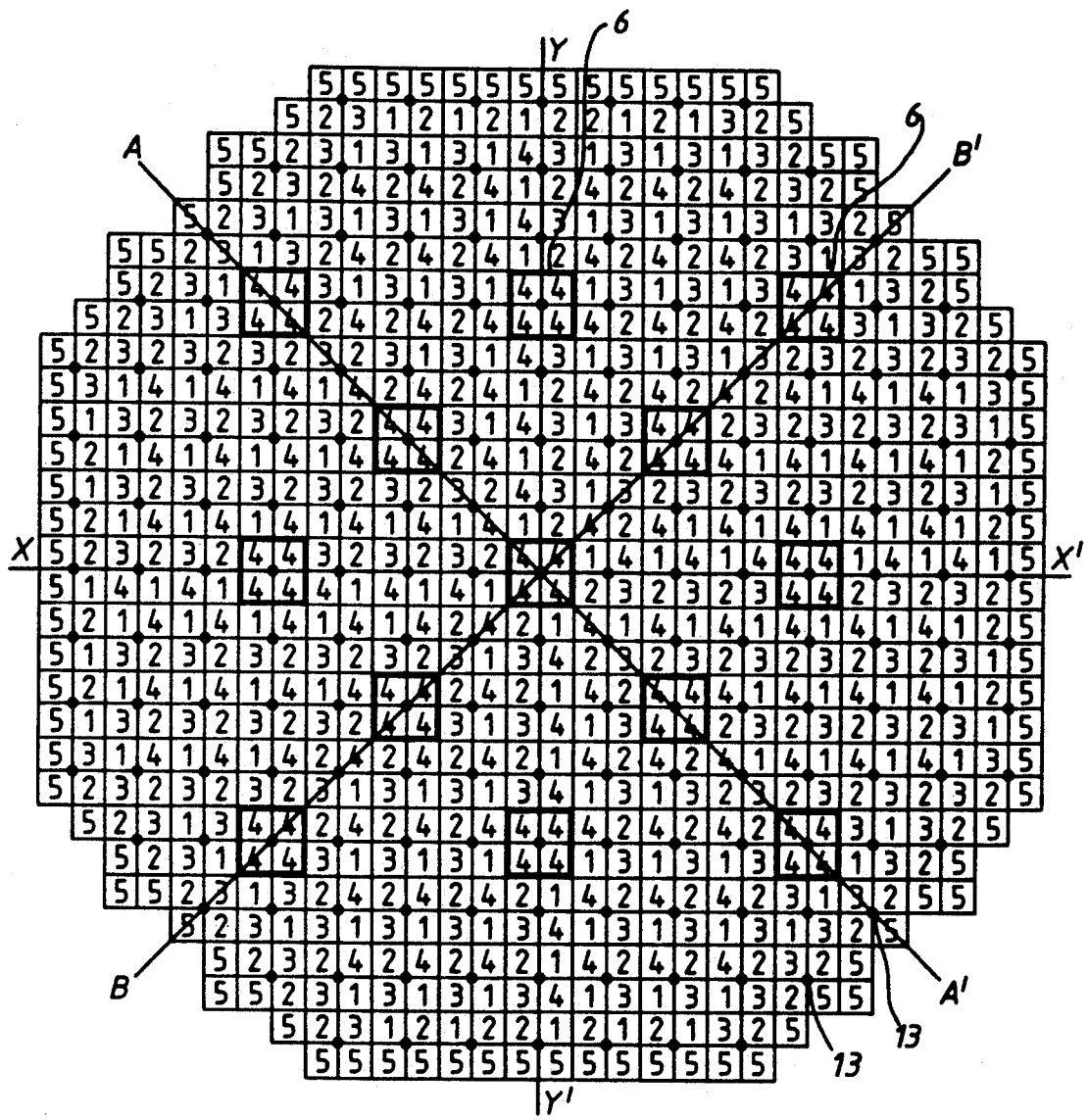
FIG. 6 is a cross-sectional view of a second embodiment of the present invention of a boiling water nuclear reactor

FIG. 6 shows a second embodiment of the present invention of boiling water nuclear reactor core. In FIG. 6 each of the identical ¼ cores divided by lines X-X' and Y-Y' is substantially mirror symmetric about the lines A-A' and B-B'. The core units on the lines A-A' or B-B' excepting cells located in outer peripheral portion of the core and the control cells 6 consist of four fuel assemblies of first-, second-, third- and fourth-burning cyclic period.

Therefore, such core construction achieves the same effect as the first embodiment.

Numerous modifications and variations of the present invention are possible in light of the above teachings. It is therefore to be understood that, within the scope of the appended claims, the present invention can be practiced in a manner other than as specifically described herein.

What is claimed is:

1. A boiling water nuclear reactor core in which a multiplicity of core units each having four fuel assemblies disposed in a square pattern adjacent to a control rod are arranged to form the reactor core, wherein said reactor core comprises:

control cells comprising four fuel assemblies which have been used in said core more than three cyclic periods; and fuel assemblies located in an outer peripheral portion of said core which have been used in said core more than three cyclic periods;

wherein a majority of the remaining core units each comprise four fuel assemblies, including one from first-burning cyclic periods, one from second-burning cyclic periods, one from third-burning cyclic periods and one from fourth-burning cyclic periods; and wherein said core is rotationally symmetric by 90 degrees, and said core can be divided into four identical ¼ cores by two perpendicular planes passing through the axial center of said core and each of said ¼ cores is substantially mirror symmetric about a further plane passing through the axial center line of said core and dividing a ¼ core into two ⅛ cores.

2. A core as claimed in claim 1, wherein said core units located on said further plane excepting said control cells include a pair of two fuel assemblies of the same burning cyclic period positioned on a first line which is perpendicular to said further plane.

3. A core as claimed in claim 2, wherein the group of fuel assemblies located next to each of said two perpendicular planes includes two pairs of two fuel assemblies, one pair being of a same burning cyclic period and the second pair being of a different burning cyclic period from the first pair, said pairs being positioned on a diagonal line in said group.

4. A core as claimed in claim 2, wherein said core units on said first line comprise a pair of first-burning cyclic period fuel assemblies and a pair of third or higher burning cyclic period fuel assemblies.

5. A core as claimed in claim 2, wherein said core is arranged so that a majority of fuel assemblies of first- or second-burning cyclic period are surrounded by fuel assemblies of third- or fourth-burning cyclic periods.

6. A core as claimed in claim 1, wherein said core is mirror symmetrical about said further plane except for those core units located on said two perpendicular planes.

7. A core as claimed in claim 1, wherein said core units on said two perpendicular planes are comprised of four fuel assemblies consisting of one first-burning cyclic periods fuel assembly, second-burning cyclic periods fuel assembly, third-burning cyclic periods fuel assembly and fourth-burning cyclic periods fuel assembly.

* * * * *